(12) United States Patent
von der Embse

(10) Patent No.: US 7,376,688 B1
(45) Date of Patent: May 20, 2008

(54) WAVELET MULTI-RESOLUTION WAVEFORMS

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 452 days.

(21) Appl. No.: 09/826,118

(22) Filed: Jan. 9, 2001

(51) Int. Cl.
    *G06F 17/10* (2006.01)

(52) U.S. Cl. .................................... 708/300

(58) Field of Classification Search ......... 708/300–490
    See application file for complete search history.

(56) References Cited

U.S. PATENT DOCUMENTS

| | | | |
|---|---|---|---|
| 5,453,945 A * | 9/1995 | Tucker et al. ............... | 708/400 |
| 5,526,446 A * | 6/1996 | Adelson et al. ............. | 382/275 |
| 5,845,243 A | 12/1998 | Smart et al. | |
| 5,937,009 A | 8/1999 | Wong et al. | |
| 5,953,388 A * | 9/1999 | Walnut et al. ................. | 378/4 |
| 6,064,768 A * | 5/2000 | Hajj et al. .................. | 708/422 |
| 6,091,777 A | 7/2000 | Guetz et al. | |
| 6,182,035 B1 | 1/2001 | Mekuria et al. | |
| 6,477,553 B1 * | 11/2002 | Druck ......................... | 708/403 |
| 6,553,396 B1 * | 4/2003 | Fukuhara et al. ........... | 708/313 |
| 6,584,111 B1 * | 6/2003 | Aweya et al. ............... | 370/412 |
| 6,643,406 B1 * | 11/2003 | Hajjahmad et al. ......... | 382/240 |
| 6,687,422 B1 * | 2/2004 | Chen et al. .................. | 708/403 |

OTHER PUBLICATIONS

Harold, Progressive Wavelet Correlation Using Fourier Methods, Jan. 1999, IEEE Transactions on Signal Processing, vol. 47, No. 1, pp. 97-107.*

Haitao et al., Wavelet Transform based Fast Approximate Fourier Transform, 1997, IEEE, pp. 1973-1976.*

Artyom, 2-D and 1-D Multipaired Transforms: Frequency-Time Type Wavelets, Feb. 2001, IEEE Transactions on Signal PRocessing, vol. 49, No. 2, pp. 344-353.*

Haitao Guo et al., "Wavelet Transform base Fast Approximate Fourier Transforms", 1997 ICASSP IEEE Int Conf Acoust Speech Signal Process Proc, pp. 1973-1976.

H. S. Stone, "Progressive Wavelet Correlation Using Fourier Analysis", Jan. 1999 IEEE Transactions on Signal Processing, vol. 47, No. 1, pp. 97-107.

A. M. Grigoryan; "2-D and 1-D Multipaired Transforms: Frequency-Time Type Wavelets", Feb. 2001 IEEE Transactions on Signal Processing, vol. 49, No. 2, pp. 344-353.

(Continued)

*Primary Examiner*—Chat C. Do

(57) ABSTRACT

A method for designing Wavelets for communications and radar which combines requirements for Wavelets and finite impulse response FIR filters including no excess bandwidth, linear performance metrics for passband, stopband, quadrature mirror filter QMF properties, intersymbol interference, and adjacent channel interference, polystatic filter design requirements, and non-linear metrics for bandwidth efficient modulation BEM and synthetic aperture radar SAR. Demonstrated linear design methodology finds the best design coordinates to minimize the weighted sum of the contributing least-squares LS error metrics for the respective performance requirements. Design coordinates are mapped into the optimum FIR symbol time response. Harmonic design coordinates provide multi-resolution properties and enable a single design to generate Wavelets for arbitrary parameters which include dilation, down-sampling, up-sampling, time translation, frequency translation, sample rate, symbol rate, symbol length, and set of design harmonics. Non-linear applications introduce additional constraints. Performance examples are linear communications, BEM, and SAR.

4 Claims, 8 Drawing Sheets

OTHER PUBLICATIONS

McClellan et al.,"A Computer Program for Designing Optimal FIR Linear Filters", IEEE Trans. Audio Electroacoust. vol. AU-21, Dec. 1973, pp. 506-526.

Vaidyanathan et al., "Eigenvalues: A New Approach to Least-Squares FIR Filter Design and Applications Including Nyquist Filters", IEEE Trans. on Circuits and Systems, vol. CA S-34, No. 1, Jan. 1987, pp. 11-23.

T. Blu, "A New Design Algorithm for two-band orthogonal rational filter banks and orthonormal rational Wavelets", IEEE Signal Processing, Jun. 1998, pp. 1494-1504.

K. C. Ho et al., "Optimum Discrete Wavelet Scaling and it's Application to Delay and Doppler Estimation", IEEE Signal Processing, Sep. 1998, pp. 2285-2290.

* cited by examiner

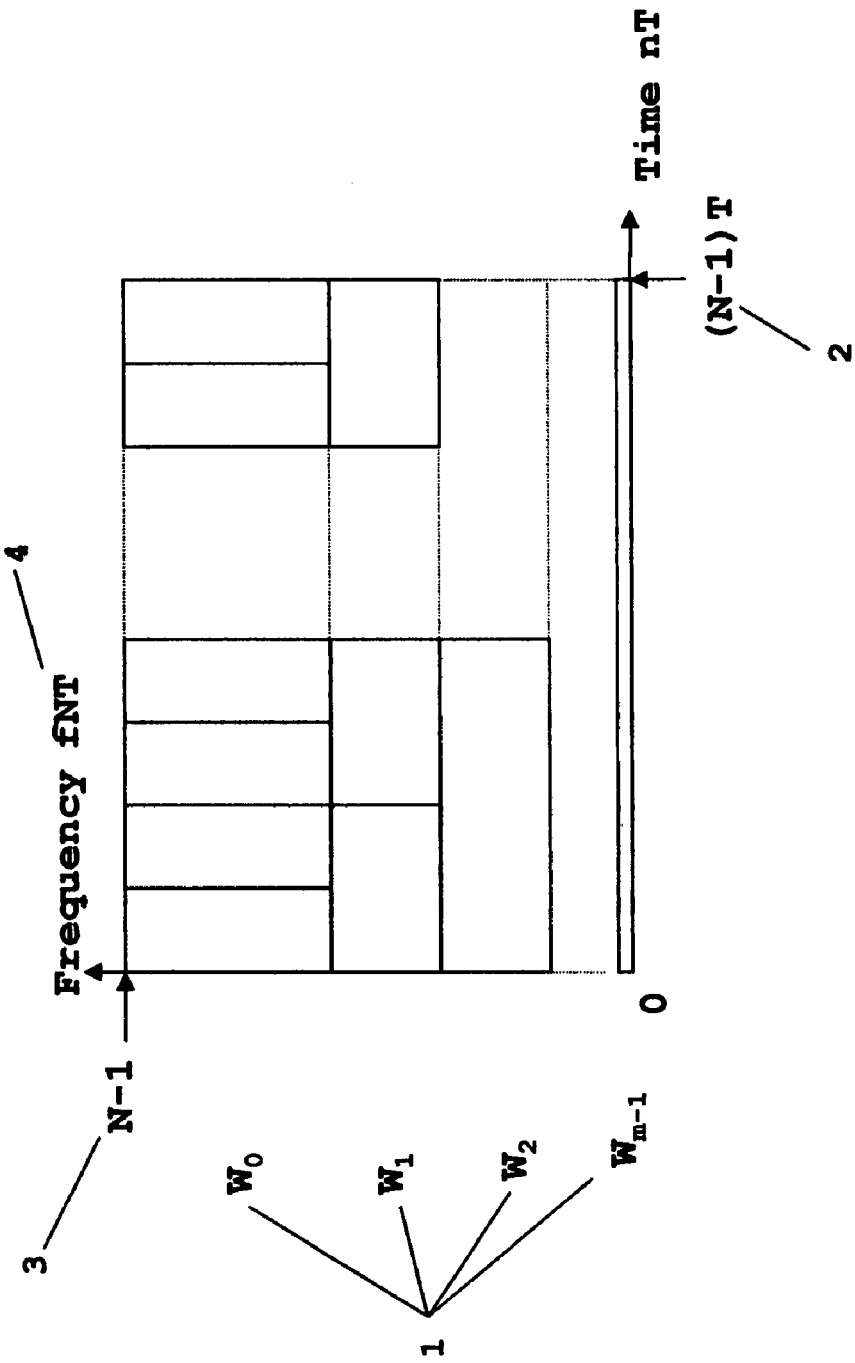
FIG. 1 Prior Art: Wavelet Tiling of an N-Point Digital t-f Space

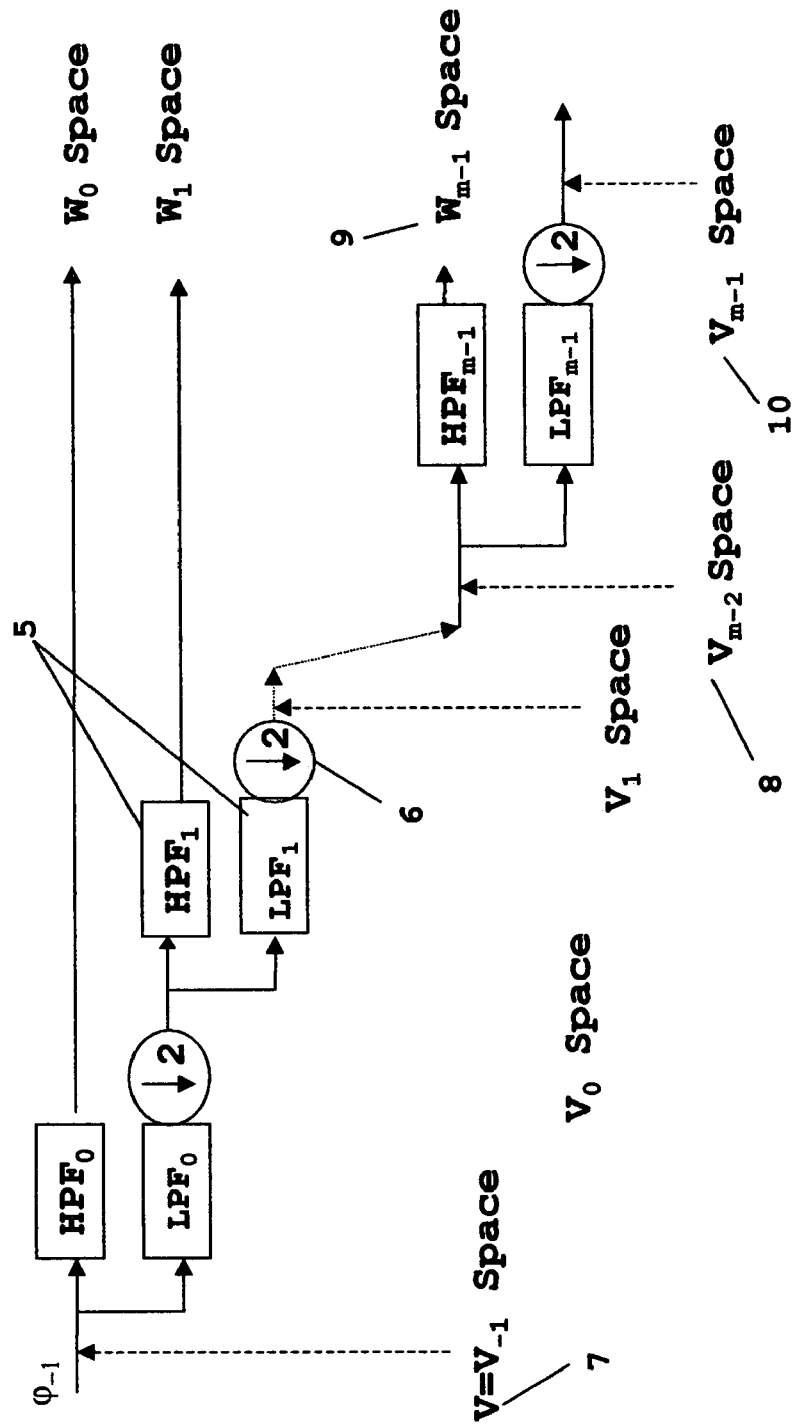
FIG. 2  Prior Art: Wavelet Iterated Filter Bank for Tiling t-f Space in FIG. 1

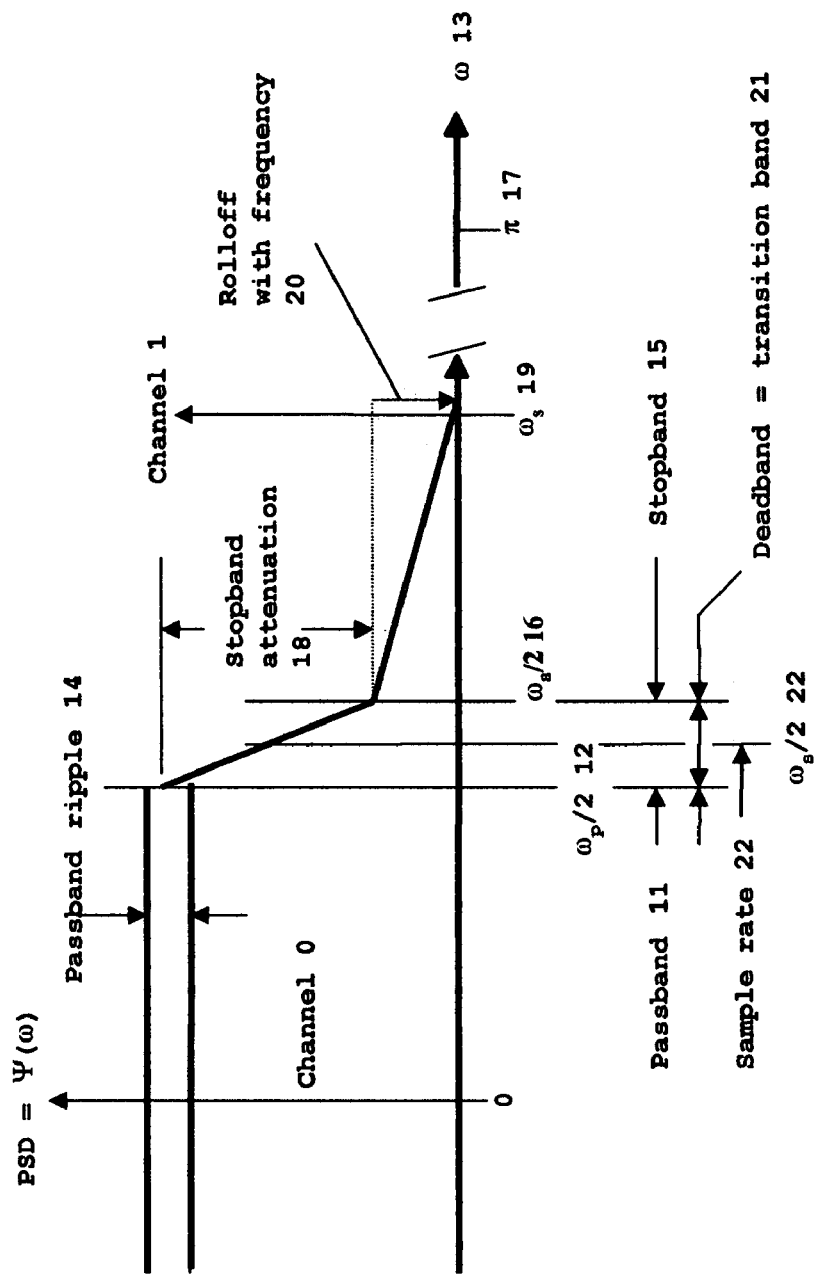
FIG. 3 PSD Requirements for Communications

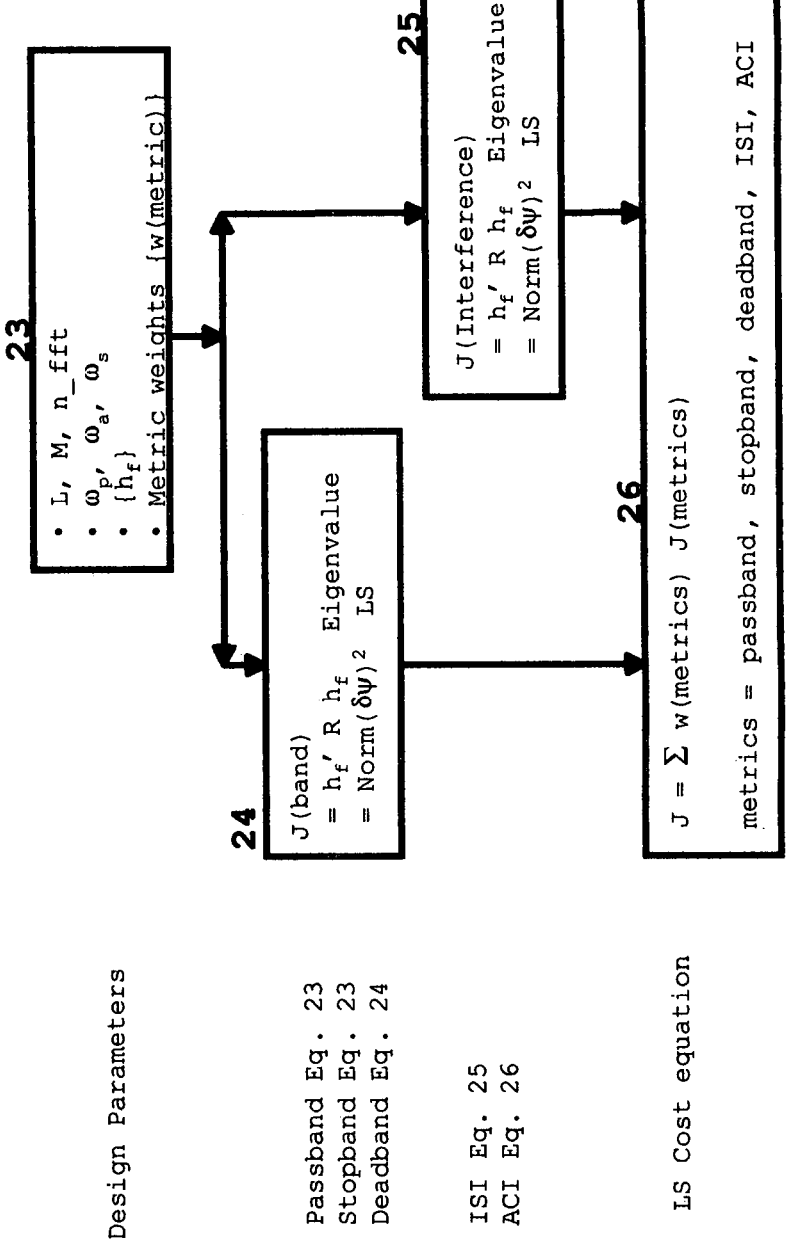
FIG. 4 LS Metrics and Cost Function for Quadratic and Norm-Squared Error Metrics

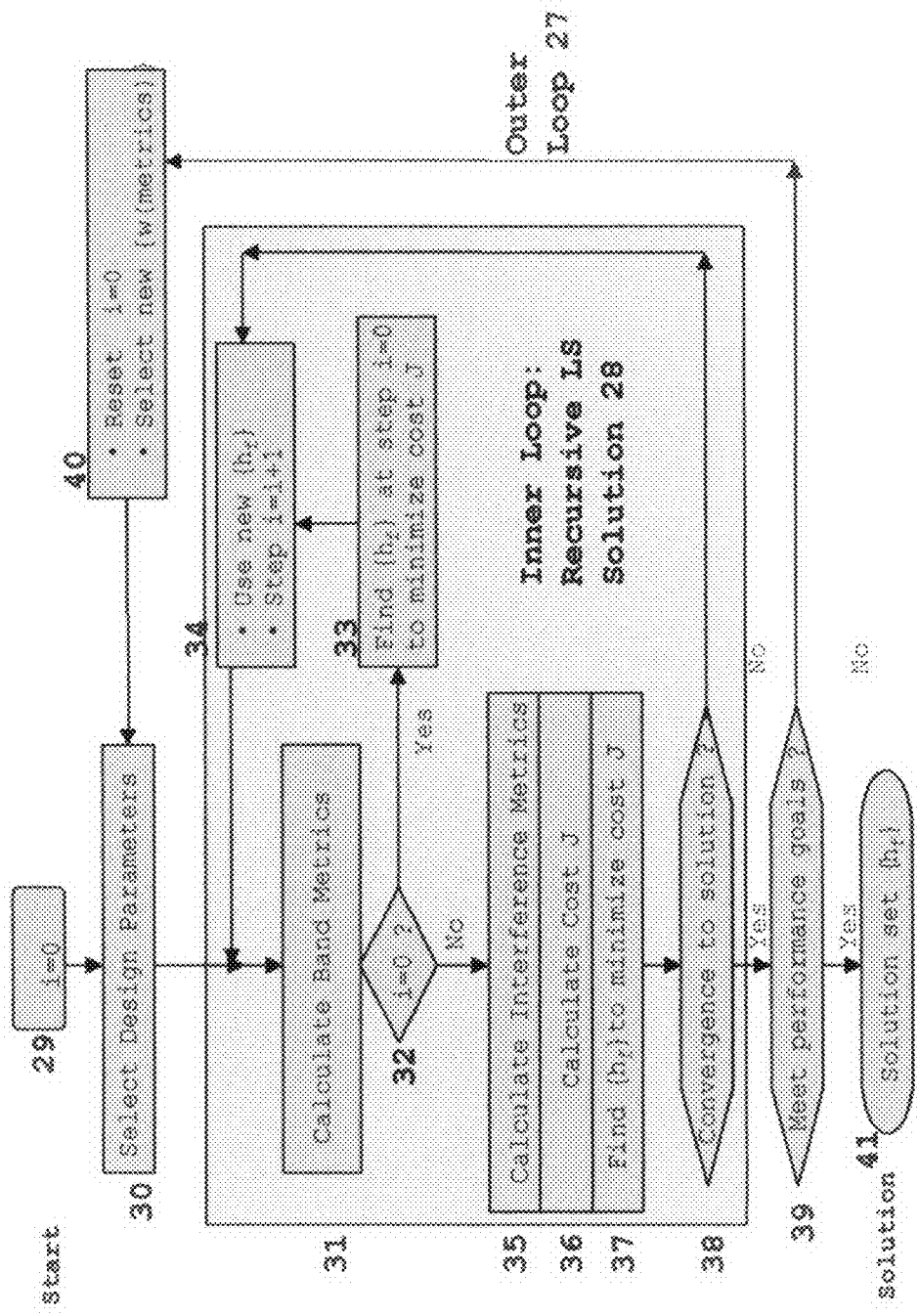

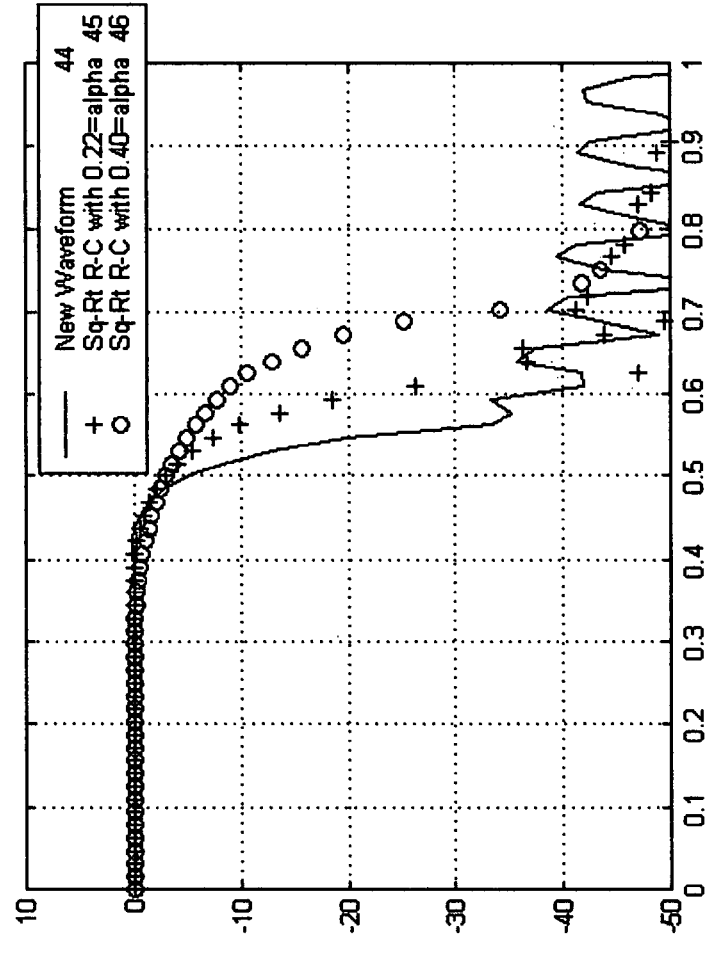
FIG. 6 PSD for New Waveform and Square-Root Raised-Cosine

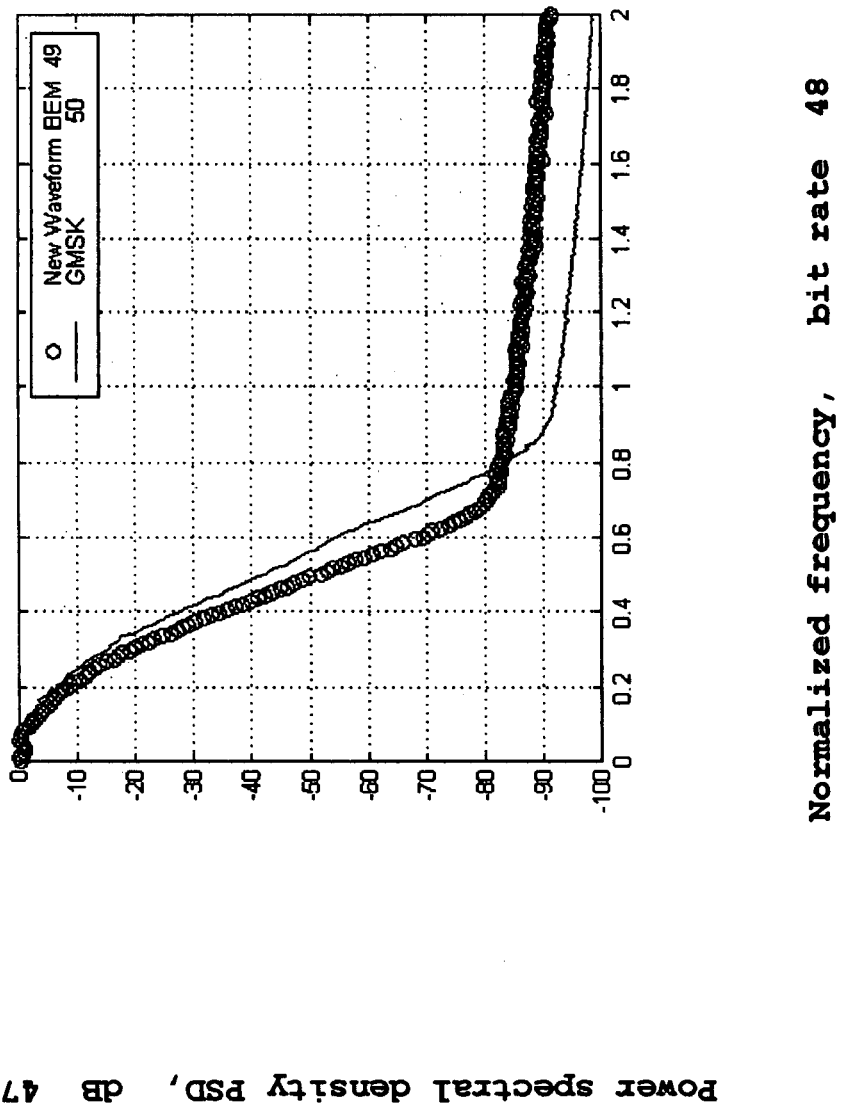
FIG. 7 PSD for New Waveform BEM and GMSK

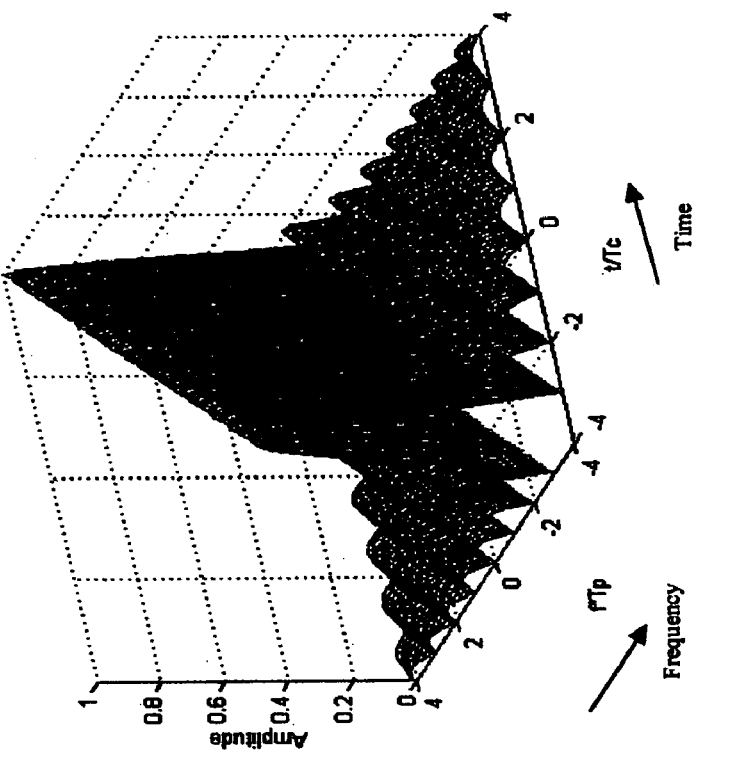
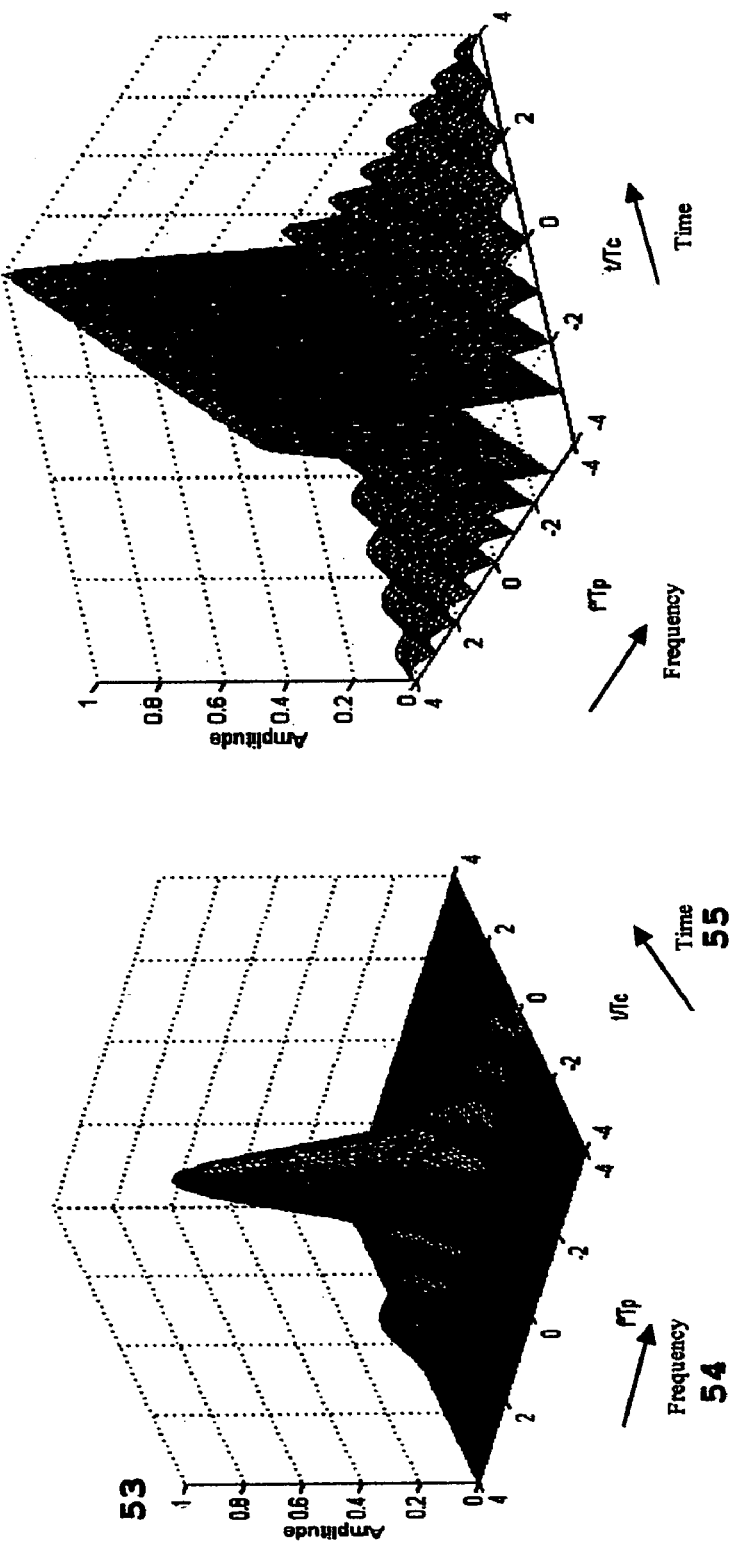
FIG. 8  Radar Ambiguity Functions of New Waveform and Unweighted Chirp Waveform

US 7,376,688 B1

WAVELET MULTI-RESOLUTION WAVEFORMS

BACKGROUND OF THE INVENTION

I. Field of the Invention

The present invention relates to CDMA (Code Division Multiple Access) cellular telephone and wireless data communications with data rates up to multiple T1 (1.544 Mbps) and higher (>100 Mbps), and to optical CDMA. Applications are mobile, point-to-point and satellite communication networks. More specifically the present invention relates to a new and novel approach to the design of waveforms and filters using mathematical formulations which generalize the Wavelet concept to communications and radar.

II. Description of the Related Art

Multi-resolution waveforms used for signaling and/or filters and which are addressed in this invention are defined to be waveforms of finite extent in time and frequency, with scale and shift properties of multi-resolution over the time-frequency (t–f) space. These waveforms can also be referred to as multi-scale waveforms, and include multi-rate filtering and the Wavelet as special cases. The emphasis will be on digital design and applications with the understanding that these multi-resolution waveforms are equally applicable to analog design and applications.

Background art consists of the collection of waveform and filtering design techniques which can be grouped into six broad categories. These categories are: C1) least squares (LS) design algorithms for filters and waveforms that design to specifications on their frequency response, C2) analytic filters and waveforms which are specified by a few free design parameters that can be sub-categorized into current applications and theoretical studies, C3) combinations of C1 and C2 for greater flexibility in meeting communications and radar performance goals, C4) special design techniques to control the noise levels from intersymbol interference (ISI) and adjacent channel interference (ACI) in the presence of timing offsets for multiple channel applications, C5) Wavelet filter design using scaling functions (iterated filter banks) as the set of design coordinates or basis functions, C6) filter and waveform design techniques for non-linear channels and in particular for operation in the non-linear and saturation regions of a high power amplifier (HPA) such as a traveling wave tube (TWT) or a solid state amplifier, and C7) LS dynamic filters derived from discrete filtering and tracking algorithms that include adaptive equalization for communications, adaptive antenna filters, Wiener filters, Kalman filters, and stochastic optimization filters.

Category C1 common examples of LS digital filter design are the eigenvalue algorithm in "A New Approach to Least-Squares FIR Filter Design and Applications Including Nyquist Filters" and the Remez-Exchange algorithm in "A Computer Program for Designing Optimum FIR Linear Phase Filters'. The eigenvalue algorithm is a direct LS minimization and the Remez-Exchange can be reformulated as an equivalent LS gradient problem through proper choice of the cost function. Both LS algorithms use the FIR (finite impulse response) digital samples as the set of design coordinates. LS design metrics are the error residuals in meeting their passband and stopband ideal performance as shown in FIG. 3. Category C2 common examples of analytical waveforms and filters for system applications are the analog Chebyshev, Elliptic, Butterworth, and the digital raised-cosine, and square-root raised-cosine. For theoretical studies, common examples are polyphase multirate filters, quadrature mirror filters (QMF), and perfect reconstruction filters. Although these theoretical studies have yet to yield realizable useful filters for system applications, their importance for this invention lies in their identification and application of ideal performance metrics for filter designs. Category C3 common digital example is to start with the derivation of a Remez-Exchange FIR filter and then up-sample and filter with another bandwidth limiting filter. This results in an FIR over the desired frequency band that is larger than available with the Remez-Exchange algorithm and with sidelobes that now drop off with frequency compared to the flat sidelobes of the original Remez-Exchange FIR. A category C4 common example is to select the free parameters of the category C3 filter in order to minimize the signal to noise power ratio of the data symbol (SNR) losses from the ISI, ACI, and the non-ideal demodulation. A second common example is start with a truncated pulse whose length is short enough compared to the symbol repetition interval, to accommodate the timing offsets without significant impact on the ISI and ACI SNR losses. This shortened pulse can then be shaped in the frequency domain.

Category C5 Wavelet filter design techniques discussed in the next section will serve as a useful reference in the disclosure of this invention. Category C6 common example is the Gaussian minimum shift keying (GMSK) waveform. This is a constant amplitude phase encoded Gaussian waveform which has no sidelobe re-growth through a non-linear or saturating HPA. Category C7 common examples are the adaptive equalization filter for communication channels, the adaptive antenna filter, and the Kalman filter for applications including target tracking and prediction as well as for equalization and adaptive antennas.

Minimizing excess bandwidth in the waveform and filter design is a key goal in the application of the C1, . . . , C6 design techniques for communications and radar. Excess bandwidth is identified as the symbol $\alpha$ in the bandwidth-time product $BT_s = 1 + \alpha$ where the two-sided available frequency band is B and the symbol repetition interval is $T_s$. Current performance capability is represented by the use of the square-root raised-cosine (sq-rt r-c) waveform with $\alpha = 0.22$ to 0.4 as shown in FIG. 8. The goal is to design a waveform with $\alpha = 0$ within the performance constraints of ISI, ACI, passband, sideband, and passband ripple. This goal of eliminating the excess bandwidth corresponds to the symbol rate equal to the available frequency band $1/T_x = B/(1+\alpha) = B$ for $\alpha = 0$. This symbol rate $1/T_s = B$ is well known to be the maximum possible rate for which orthogonality between symbols is maintained. A fundamental performance characteristic of the new waveform designs is the ability to eliminate excess bandwidth for many applications.

Scope of this invention will include all of the waveform and filter categories with the exception of category C4 special design techniques and category C7 LS dynamic filters. Emphasis will be on the category C5 Wavelets to establish the background art since Wavelets are multi-resolution waveforms that can eliminate the excess bandwidth and have known design algorithms for FIR waveforms and filters. However, they do not have a design mechanism that allows direct control of the ISI, ACI, passband, sideband, and passband ripple. Category C2 theoretical studies also eliminate the excess bandwidth. However, they are not multi-resolution waveforms and do not have realizable FIR design algorithms. So the emphasis in background art will be on Wavelets whose relevant properties we briefly review.

Wavelet background art relevant to this invention consists of the discrete Waveform equations and basic properties, application of Wavelets to cover a discrete digital time-frequency (t–f) signal space, and the design of Wavelets using the iterated filter construction. Wavelets are waveforms of finite extent in time (t) and frequency (f) over the t–f space, with multi-resolution, scaling, and translation properties. Wavelets over the analog and digital t–f spaces respectively are defined by equations (1) and (2) as per Daubechies's "Ten Lectures on Wavelets", Philadelphia: _SIAM, 1992

Continuous Wavelet $$\psi_{a,b}(t) = |a|^{-1/2}\psi\left(\frac{t-b}{a}\right) \quad (1)$$

Discrete Wavelet $$\psi_{a,b}(n) = |a|^{-1/2}\psi\left(\frac{n-b}{a}\right) \quad (2)$$

where the two index parameters "a,b" are the Wavelet dilation and translation respectively or equivalently are the scale and shift. The $\psi$ is the "mother" wavelet and is a real and symmetric localized function in the t–f space used to generate the doubly indexed Wavelet $\psi_{a,b}$. The scale factor "$|\alpha|^{-1/2}$", has been chosen to keep the norm of the Wavelet invariant under the parameter change "a,b". Norm is the square root of the energy of the Wavelet response. The Wavelets $\psi_{a,b}$ and $\psi$ are localized functions in the t–f space which means that both their time and frequency lengths are bounded. The discrete Wavelet has the time "t" replaced by the equivalent digital sample number "n" assuming the waveform is uniformly sampled at "T" second intervals.

Wavelets in digital t–f space have an orthogonal basis that is obtained by restricting the choice of the parameters "a,b" to the values $a=2^{-P}$, $b=qM2^P$ where "p, q" are the new scale and translation parameters and "M" is the spacing or repetition interval $T_s=MT$ of the Wavelets (which from a communications viewpoint are symbols) at the same scale "p". Wavelets at "p,q" are related to the mother Wavelet by the equation $$\psi_{p,q}(n)=2^{-p/2}\psi(2^{-p}n-qM) \quad (3)$$

where the mother Wavelet is a real and even function of the sample coordinates at dc (dc refers to the origin f=0 of the frequency f space). The orthonormality property means that these Wavelets satisfy the orthogonality equation with a correlation value equal to "1".

$$\sum_n \psi_{p,q}\psi_{k,m} = 1 \text{ if both } p = k \text{ and } q = m \quad (4)$$
$$= 0 \text{ otherwise}$$

Wavelet representation of a digital t–f space starts with selecting an N sample time window of a uniform stream of digital samples at the rate of 1/T Hz (1/second) equivalent to a "T" second sampling interval. The N point or sample t–f space in FIG. 1 illustrates a Wavelet representation or "tiling" with Wavelets that are designed analytically or by an iterated filter construction.

The t–f space in FIG. 1 is partitioned or covered or tiled by a set of Wavelet subspaces $\{W_p, p=0, 1, \ldots, M-1\}$ where $N=2^m$. Each Wavelet subspace $W_p$ 1 at scale "p" consists of the set of Wavelet time translations $\{q=0, 1, \ldots, N/2^{p+1}-1\}$ over this subspace. These Wavelet subspaces are mutually orthogonal and the Wavelets within each subspace are mutually orthogonal with respect to the time translates. This N-point t–f space extends over the time interval from 0 to (N−1)T 2 and over the frequency interval from 0 to (N−1) 3 in units of the normalized frequency fNT 4.

The iterated filter bank in FIG. 2 is used to generate the Wavelets which cover the t–f space in FIG. 1. Each filter stage 5 consists of a high pass filter (HPF) and a low pass filter (LPF). Output 6 of the LPF is subsampled by 2 which is equivalent to decimation by 2. This t–f space space is an N-dimensional complex vector metric space V 7. At stage m in the iterated filter bank, the remaining t–f space $V_{m-1}$ 8 is partitioned into $V_{m+1}$ 9 and the Wavelet subspace $W_{m+1}$ 10.

Scaling functions and Wavelets at each stage of this filter bank satisfy the following equations $$\varphi(n) = 2^{-1/2}\sum_q h_q\varphi(2n-q)\forall\, q \quad (5)$$

$$\psi(n) = 2^{-1/2}\sum_q g_q\varphi(2n-q)\forall\, q$$

where σ is the scaling function, $\psi$ is the Wavelet, $HPF_p$ coefficients are $\{h_q, \forall_q\}$, $LPF_p$ coefficients are $\{g_q, \forall_q\}$, and the equations apply to the stages 0, 1, . . . , m−1. Identifying the scale parameter and using the previous Wavelet formulations enable these equations to be rewritten for stages p=0, 1, . . . , m−1 as $$\varphi_p = \sum_q h_q\varphi_{p-1,q}\forall\, p \quad (6)$$

$$\psi_p = \sum_q g_q\varphi_{p-1,q}\forall\, p$$

For the application the $HPF_p$ and $LPF_p$ are quadrature mirror filters (QMF) with perfect reconstruction. This means they cover the subspace $V_p$ with flat responses over the subband frequency including the edges of the frequency subband, and the $HPF_p$ coefficients are the frequency translated coefficients for the $LPF_p$: $\{g_q=(-1)^q h_q, \forall q\}$.

Wavelet design using iterated filter bank starts with the selection of the scaling functions. Starting with a primative scaling function such as the one proposed by Daubechies, one can use the iterated filter construction given by equations (5) and (6) to derive successive approximations to a desired scaling function which has properties that have been designed into it by the selection of the filter coefficients $\{g_q, \forall_q\}$ at each level of iteration. The Wavelets can be derived from these scaling functions using the iterated filter construction or scaling equations (5) and (6).

Another use of the iterated filter construction is to design the scaling functions as Wavelets thereupon ending up with a larger set of Wavelets for multi-resolution analysis and synthesis as illustrated by Coifman's Wavelets in "Wavelet analysis and signal processing".

SUMMARY OF THE INVENTION

This invention for the design of multi-resolution Wavelet waveforms improves their performance for engineering and scientific applications, and in particular for applications to communications and radar. Current practice is to 1) design traditional multi-resolution waveforms in the time domain using metrics which specify frequency performance and without consideration of Wavelet properties or to 2) design Wavelet multi-resolution waveforms using the time-domain iterated multi-resolution filtering approach with a set of scaling functions used to perform the filtering and without direct considerations of the frequency performance. These two separate design approaches yield fundamentally different waveforms. This invention provides a means to combine these two approaches to generate a new multi-resolution Wavelet waveform with the best properties of the traditional multi-resolution waveforms and the Wavelet multi-resolution waveform.

This invention introduces innovations for the design of the Wavelet waveform that 1) include the ISI (intersymbol interference), ACI (adjacent channel interference), and QMF (quadrature mirror filter) requirements into the design algorithm along with non-linear modifications to the traditional passband and stopband frequency requirements which are used in the Remez-Exchange and eigenvalue LS algorithms, 2) select the frequency harmonics as the design coordinates, 3) use an appropriate subset of the available Fourier domain frequency harmonics as the design coordinates with the property that this subset of coordinates is a basis for the multi-resolution Wavelet waveform design, and 4) design the multi-resolution Wavelet waveform for no excess bandwidth $\alpha=1$.

These innovations support the development of the new waveforms 1) that are generalizations of Wavelets in the frequency domain using a means which makes them useful for communications and radar over their t–f space, 2) that can be designed to be an orthonormal (orthogonal and normalized) basis or orthonormal set of coordinates over the available frequency bandwidth with the implicit property that the excess bandwidth vanishes $\alpha=0$ to within the accuracies allowed by communication and radar design implementations, and 3) that have multi-scale properties which allow a single dc waveform design to be used to uniquely define the complete set of waveforms over the t–f space for multi-scale applications. Specific design algorithm examples developed in this invention disclosure are the LS design algorithms that use eigenvalue and gradient search techniques in the frequency domain to find the best waveform design which minimizes the corresponding LS error residual cost function that is a weighted linear sum of the residual error metrics.

Wavelet waveform performance calculated in this invention disclosure from the application of these LS design algorithms, demonstrates the capability of this invention to provide a means to design waveforms that are improved over current practice. There are other algorithmic design algorithms which can be realized by modifications to this invention. Two examples given in this invention disclosure are the modification of these LS algorithms for application to constant amplitude bandwidth efficient (BEM) waveforms for communications and to synthetic aperture radar (SAR) waveforms.

BRIEF DESCRIPTION OF THE SEVERAL VIEWS OF THE DRAWINGS

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 1 is a Wavelet N-point t–f space extending over the time interval (0, (N−1)T] and the frequency interval (0, (N−1)/NT], which is tiled or covered by a set of orthonormal Wavelets at the scales p=0, 1, . . . , m−1.

FIG. 2 is a Wavelet iterated filter bank used to generate the set of Wavelets which tile or cover the t–f space in FIG. 1.

FIG. 3 illustrates the power spectral density (PSD) of the new Wavelet waveform at dc, and the set of stopband and passband design requirements.

FIG. 4 is the flow diagram of the LS metrics and cost functions and the final cost function used to find the optimal LS solution for the Wavelet waveform.

FIG. 5 is the flow diagram for the eigenvalue recursive solution algorithm to find the optimal harmonic coordinates that define the LS solution for the Wavelet waveform.

FIG. 6 plots the dc PSD in dB units for the frequency response of the mother Wavelet at dc and the square-root raised-cosine (sq-rt r-c) waveforms with excess bandwidth parameter $\alpha=0.22$, $0.40$ vs. the normalized frequency in units of symbol rate $1/T_s$.

FIG. 7 plots the dc PSD in dB units vs. the normalized frequency $fT_s$ for the Wavelet waveform designed with modifications to the LS algorithms for application to constant amplitude BEM communications, and for a Gaussian minimum shift keying (GMSK) waveform.

FIG. 8 plots the amplitude of the dc radar ambiguity function vs. the normalized frequency $fT_p$ and normalized time $tT_c$ where the pulse time $T_p$ and chip time $T_c$ are both equal to the communications symbol interval $T_s$ for this example, for the new waveform and an unweighted chirp waveform.

DETAILED DESCRIPTION OF THE INVENTION

New Wavelet waveforms in this invention disclosure are generalizations of Wavelets in t–f space which enable them to be useful for communications and radar applications. This generalization is accomplished by 1) the introduction of a frequency translation, by 2) changing the orthonormality condition in equation (4) to apply to waveforms within the same space {q} and over the scales {p} with the inclusion of the frequency translation, and 3) by their characterization and design in the Fourier domain. With frequency translation the analytical formulation of these new waveforms as a function of the baseband or mother waveform centered at dc becomes $$\psi_{p,q,r}(n) = 2^{-p/2}\psi(2^{-p}n - qM)e^{i2\pi f_c(p,r)n(p)2^pT} \quad (7)$$

where $f_c(p,r)$ is the center frequency of the frequency translated dc waveform, at scale "p" and frequency index "r". The purpose of the frequency index "r" is to identify the center frequencies of the waveforms at the scale "p" in the t–f space.

These waveforms satisfy the complex orthonormality equations $$\sum_n \psi_{p,q,r}\psi^*_{k,m,v} = 1 \text{ if } p=k \text{ and } q=m \text{ and } r=v \quad (8)$$

$$= 0 \text{ otherwise}$$

where "*" is complex conjugation, and are generalizations of the orthonormality equations for the analytical Wavelets in (4).

The new waveforms in equation (7) expand the Wavelet analytical formulation to include a frequency variable. Wavelets are functions of the scale and translation parameters "p,q". The frequency variable together with the Fourier domain design are entirely new means for deriving these new waveforms as generalization of the traditional Wavelets These waveforms are generalizations of Wavelets in the frequency domain using a means which makes them useful for communications and radar in the t-f space. The basis vectors for this metric space V consist of a subset of the admissible set of scaled and translated waveforms $\{\psi_{p,q,r}, \forall_{p,q,r}\}$ derived from the dc waveform $\psi$ as per equation (7). An admissible waveform is any combination that covers V=t-f space. We are interested in, the Fourier domain representation of the dc waveform $\psi$ in V, and in particular in a subset of the discrete Fourier transform (DFT) harmonic coefficients over the Fourier domain which we intend to use as the design coordinates. Starting with the z-transform and continuous Fourier transform, the DFT harmonic coefficients are defined by the following equations DFT Harmonic Coefficients (9)

$$\psi(z) = \sum_n \psi(n) \, z^{-n} \quad \text{z-transform}$$

$$\psi(\omega) = \sum_n \psi(n) \, e^{-i\omega n} \quad \text{Fourier transform}$$

$$\psi_k = \psi(k)$$
$$= \sum_n \psi(n) \, W_{N'}^{-kn} \quad \text{DFT harmonic coefficients for } \forall k$$

where $$\psi(\omega) = (1/N') \sum_k \psi_k \sum_n e^{i(2\pi k/N' - \omega)n}$$

$$= \sum_k \psi_k \, \sin((\omega/2 - \pi k/N')N')/N\sin(\omega/2 - \pi k/N')$$

$$= \sum_k \psi_k \quad [\text{Harmonic interpolation for "k"}]$$

$W_{N'}^{kn} = e^{i2\pi kn/N'}$
k=DFT frequency or harmonic coefficients such that $f_k = k/N'T$ where $f_k$ is the harmonic frequency corresponding to "k"
N'=length of $\psi(n)$ wherein $\Psi(\omega) = |\psi(\omega)|^2$ is the power spectral density of the dc waveform. These equations define the frequency representation of the new waveforms in terms of the available set of harmonic coefficients, which set is considerable larger than required for most applications.

The new waveforms are an orthonormal basis with no excess bandwidth, which properties are asymptoticly approached by the new waveforms to within design accuracies inherent in communications and radar. To demonstrate these properties we need to identify the structure of the dc waveform in V. We start with definitions for the parameters and coordinates in the following equation (10). The waveforms derived from the dc waveform will be designed to be orthogonal over both time translates "MT" and frequency translates "1/MT" which respectively correspond to the Wavelet symbol spacing $T_s = MT$ and the adjacent channel spacing $1/T_s$. This means the orthogonal spacing of the waveforms in V are at the time-frequency increments (MT, 1/MT)=$(T_s, 1/T_s)$. In the interests of constructing the orthonormal multi-resolution waveforms to cover V it will be convenient to assume that M,L are powers of 2. We need the following definitions for the parameters and coordinates.

Parameters and Coordinates (10)

$N'$ = Length of $\psi$ which is an even function about the center and which spans an odd number of points or samples
  = $ML + 1$ where $M, L$ are assumed to be even functions for convenience of this analysis
  = Number of points of $\psi$
$M$ = Sampling interval for $\psi$
  = Spacing of $\psi$ for orthogonality
$L$ = Length of $\psi$ in units of the sample interval $M$
  = Stretching of $\psi$ over $L$ sample intervals
$n = n_0 + n_1 M$
  = partitioning into an index $n_0$ over the sample length $n_0 = 0, 1, \ldots, M-1$ and an index $n_1 = 0, 1, \ldots, L-1$ over the sample intervals
$k = k_0 + k_1 L$
  = partitioning into an index $k_0$ over the harmonic frequencies $k_0 = 0, 1, \ldots, L-1$ corresponding to the stretching and an index $k_1 = 0, 1, \ldots, M$ over the harmonics frequencies corresponding to the admissible frequency slots for $\psi$ The harmonic design coordinates are selected using the following observation. For most applications and in the following development it is assumed that the waveforms are spectrally contained in the frequency interval 1/MT corresponding to the frequency spacing. This suggests the harmonic design coordinates be restricted to the subset of L harmonics $\{k_o = 0, 1, \ldots, L-1\}$ covering this spacing. These L harmonics correspond to the stretching of the mother waveform over the L repetition intervals.

Obviously, for some applications as will be demonstrated later, the spectral containment is spread out over several 1/MT frequency increments whereupon one must increase the subset of design harmonics to possibly 2L, 3L or larger.

The DFT equations for the dc waveform in (9) when rewritten in terms of the L harmonic design coordinates $\{\psi_{k_o}, \forall_{k_o}\}$ become:
DFT equations for dc waveform $$\psi_{k_0} = \sum_n \psi(n) \, W_{N'}^{-k_o n} \quad \text{harmonic design coordinates} \quad (11)$$

$$\psi(n) = (1/N') \sum_{k_0} \psi_{k_0} W_{N'}^{k_o n} \quad \text{new waveform defined in terms of the } L \text{ harmonic design coordinates } \{\psi_{k_0}, \forall k_0\}$$

It will now be shown that the use of these L harmonic design coordinates is sufficient under time translates to be a basis for the corresponding subspace of V which means these waveforms provide a complete set of coordinates to describe this subspace. We will use the theorems of Karhunen-Loeve and Mercer and will limit the demonstration to the dc waveform for simplicity and without loss of generality. We start by considering the expansion of a random complex sequence $\{z(n), \forall n\}$ in a series of waveform coordinates consisting of time translates of the mother waveform $\psi$. The sequence $\{z(n), \forall n\}$ is a zero-mean stationary random process which is orthonormal over the sample interval "M" and has a frequency spectrum which is flat and extends over the frequency range 1/MT which is centered at baseband corresponding to a zero frequency. This means the $\{z(n), \forall n\}$ cover the subspace of V corresponding to the scale of the dc waveform V and its time translates $\{\psi(n-qM)=\psi_q(n), \forall q\}$. In addition, the V is now considered to be extended over a time interval which is relatively large compared to the N-dimensional t–f space in FIGS. 1,2 to avoid end-effects on the analysis. We start by approximating the sequence $\{z(n), \forall n\}$ by the $\{\hat{z}(n), \forall n\}$ where:

$$\hat{z}(n) = \sum_q Z_q \psi(n - qM) \quad (12)$$

$$= \sum_q Z_q \psi(n_0 + (n_1 - q)M)$$

where the complex coefficients $\{Z_q\}$ are derived from the original sequence using the orthogonality properties of $\psi$ $$Z_q = \sum_n z(n) \psi * (n - qM)$$

$$= \sum_n z(n) \psi_q(n)$$

The following equations prove that the coefficients $\{Z_q, \forall_q\}$ are orthonormal:

$$Z_q Z_{q'} * = \sum_{\Delta n} z(\Delta n - qM) z * (\Delta n - q'M) \psi_q(\Delta n) \psi_{q'} *(\Delta n) \quad (13)$$

$$= \delta_{qq'} \sum_n |\psi_q(n)|^2 \text{ since the sequence } \{z\} \text{ is}$$

orthonormal for $qM$ time translates $$= \delta_{qq'} \text{ with normalization of the energy of } \psi$$

Equations (12) and (13) together prove the Karhunen-Loeve's theorem which proves the following equation for the accuracy in approximating the stochastic sequence $\{z(n), \forall n\}$ by $\{\hat{z}(n), \forall n\}$. This accuracy is expressed by the expected "E(o)" squared error "(o)" in this approximation:

$$E\{|z(n) - \hat{z}(n)|^2\} = 1 - \sum_{n_1} |\psi(n_0 + n_1 M)|^2 \quad (14)$$

We need to prove that the right hand side of this equation is zero which then proves that the approximating sequence is equal to the original sequence in the mean-square sense. In turn this proves that the new waveform coordinates $\{\psi_q, \forall_q\}$ are a basis for the original sequence $\{z(n), \forall n\}$ which is the goal.

The right hand side of equation (14) when set equal to zero expresses Mercer's theorem so the goal is to prove Mercer's theorem. To do this we use the DFT of $\psi$ in equation (11) and the coordinates in (10) to evaluate the right hand side of equation (14). We find $$1 - \sum_{n_1} |\psi(n + n_1 M)|^2 = 1 - \sum_{k_0} \sum_{k_{0'}} \psi_{k_0} \psi_{k_{0'}} W_N^{\Delta k_0 n_0} \Gamma \quad (15)$$

where $\Gamma = (1/L) \sum_{n_1} W_L^{\Delta k_0 n_1}$ $$= \sin(\pi \Delta k_0)/L \sin(\pi \Delta k_0 / L)$$

$$= 1 \text{ for } \Delta k_0 = 0$$

$$= 0 \text{ otherwise}$$

This proves that $$1 - \sum_{n_1} |\psi(n + n_1 M)|^2 = 0 \; \forall n_0$$

which proves that equation (14) reduces to $$E\{|z(n) - \hat{z}(n)|^2\} = 0 \quad (16)$$

Which, as per the above, proves that the set of multi-resolution waveforms is a basis. This proof easily generalizes to the multi-resolution waveforms at all of the scales $\{p\}$ and time translates $\{q\}$, and to the expansion of the harmonic design coordinates over 2L, 3L, . . . as required by the application.

Next we demonstrate that these waveforms have multi-scale properties. We start with the observation that the Fourier domain design for the new waveforms provides a natural and easy way to derive the complete set of waveforms $\{\psi_{p,q}, \forall p,q\}$ for the space V from the design of the dc waveform $\psi$ by using the same invariant set of Fourier domain harmonic design coordinates $\{\psi_{k_q}, \forall_{k_q}\}$ derived for the dc multi-resolution waveform. This demonstration requires that we show 1) how the multi-scale transformations are implemented with the design in the Fourier domain, and 2) how the waveform design remains invariant under scale changes.

First consider the multi-scale transformation which derives the waveforms at the scale and shift parameters "p,q" from the dc waveform at scale "p=0" and centered at the origin "q=0". We begin by extending the parameters and coordinates in equation (10), to include both scaling and subsampling or decimation in a form that is equivalent to the iterated filter bank construction which is used to derive the current Wavelet waveform using the filter scaling functions. Starting with the coordinates at scale "p=0" the parameters and coordinates at scale "p=p" are given by the equations:

$$p = 0 \quad \text{parameters and coordinates} \quad (17)$$

$$n = n_0 + n_1 M$$

$$n_0 = a_0 + a_1 2 + \ldots + a_{m-1} 2^{m-1}$$

$$= M \text{ points}$$

$$M = 2^m$$

$$n_1 = b_0 + b_1 2 + \ldots + b_{l-1} 2^{l-1}$$

$$= L \text{ points spaced at } M \text{ sample intervals}$$

-continued $p = p$  parameters and coordinates $2^{-p}n(\downarrow 2^p)$ = scaled by "$2^{-p}$" and subsampled or
decimated by $2^p : 1$ wherein $2^p : 1$
reads "$2^p$ to 1 decimation"
$= n_0(p) + n_1(p)M$ $2^{-p}n_0(\downarrow 2^p)$ = scaled by "$2^{-p}$" and subsampled or
decimated by $2^p : 1$
$= n_0(p)$
$= a_p + a_{p-1} 2 + \ldots + a_{p+m-1} 2^{p+m-1}$
$= M$ points spaced at $2^p$ sample intervals $2^{-p}n_1(\downarrow 2^p)$ = scaled by "$2^{-p}$" and subsampled or
decimated by $2^p : 1$
$= n_1(p)$
$= b_p + b_{p+1} 2 + \ldots + b_{p+1-1} 2^{p+1-1}$
$= L$ points spaced at $M2^p$ sample intervals together with the observation that the sampling interval "T" is increased to "$2^pT$" under the scale change from "p=0" to "p=p" and subsampling or decimation from "1:1" to "$2^p$:1". Combining these equations with the analytical formulation in (7) and the Fourier domain representation in (11) enables the waveforms at the parameters "p,q" to be written as a function of the Fourier domain harmonic design coordinates:

$$\psi_{p,q,r}(n) = 2^{-p/2}\psi(2^{-p}n - qM)e^{i2\pi f_c(p,r)n(p)2^pT} \quad (18)$$

$$= (2^{-p/2}/N')\sum_{k_0} \Psi_{k_0} W_{N'}^{k_0(n(p)-qM)} e^{i2\pi f_c(p,r)n(p)2^pT}$$

for all admissible scale, translation, and frequency index parameters "p,q,r".

Next we need to demonstrate that the frequency domain design in (11) remains invariant for all parameter changes and in particular for all scale changes. This multi-scale property expresses the accordion behavior of the design in that the Wavelets at different scales are simply the stretched and compressed versions of the mother waveform with the appropriate frequency translation indices. This multi-scale invariancy means that the design for a M=16 channel filter bank remains the same for M=100 or M=10,000 channel filter banks, when the overlap L and the performance goals remain constant. To demonstrate this invariant property across scales, we consider the multi-resolution waveform at scale "p" with the other parameters set equal to zero for convenience "q=0, r=0" and without loss of generality. The Fourier domain frequency response $\psi(f)$ can be evaluated starting with the original formulation in equation (7):

$$DFT \text{ at } "p, q = 0, r = 0" \quad (19)$$

-continued $$\psi_p(f) = (1/N')\sum_{k_0}\psi_{k_0}\sum_{n(p)} W_{N'}^{-(fN'2^pT-k_0)n(p)}$$

$$= \sum_{k_0}\psi_{k_0}\left[\frac{\sin(\pi(fN'2^pT-k_0))}{N'\sin(\pi(fN'2^pT-k_0)/N')}\right]$$

$$= \sum_{k_0}\psi_{k_0}[\text{Harmonic interpolation for "}k_0\text{"}]$$

This only differs from the harmonic representation in equation (9) in the restriction of the design coordinates to the subset of harmonic coefficients $\{\psi_{k_o}, \forall_{k_o}\}$ and the stretching of the time interval to "$2^pT$" corresponding to the scale "p=p". The harmonic interpolation functions are observed to remain invariant over scale changes upon observing that the frequency scales as "$f\sim\frac{1}{2^p}T$" wherein "$\sim$" is a proportionality operator, which means the "frequency-time" product remains invariant with scale changes as per the fundamental property of the waveforms. This means the harmonic interpolation functions remain invariant with scale change and therefore the frequency response remains an invariant. This demonstrates the waveform design is an invariant across the waveform scales which means we only need a single design for all scales or resolutions of interest.

LS design algorithms for new waveform will be described to illustrate the advantages the waveform has over current designs. The two LS algorithms described are the eigenvalue and the gradient search which respectively can be reduced to algorithms which are equivalent to current eigenvalue and Remez-exchange waveform design algorithms for application to a uniform filter bank. We consider the t-f space which is spanned by a uniform polyphase filter bank consisting of M channels at the frequency spacing $\psi_w = 1/MT$ where T is the digital sampling interval, and the filter waveform FIR time response is stretched over L sampling time intervals $T_s$. This polyphase filter bank is ideally decimated which means the filter ouput sample rate $1/T_s$ is equal to the channel-to-channel spacing $T_s = MT$, equivalent to stating that there is no excess bandwidth $\alpha = 0$. The design for this topology is immediately applicable to an arbitrary set of multi-resolution filters through the scaling equation (18) which gives the design of the waveform at arbitrary scales in terms of the design of the dc waveform.

For this polyphase filter bank used to construct the dc waveform or filter impulse response, the LS example design algorithms will use 5 metrics consisting of the 2 prior art passband and stopand metrics, and the 3 new metrics consisting of the ISI, ACI, and QMF, and solve the LS minimization problem using as design coordinates the subset of harmonic coordinates which are a basis. Since the two example LS design algorithms only differ in the use of an eigenvalue LS optimization and the use of a gradient search LS optimization, the flow diagrams for the construction of the cost functions and the solution for the optimal waveform will be identical. However, there are differences in the construction of the cost functions from the respective metrics and in the iterative solution mathematics. Both LS solutions for the harmonic design coordinates minimize the weighted sum of the error residuals or cost functions from the 5 metrics. These design coordinates are the Fourier harmonics $\{\psi_{k_o}, \forall_{k_o}\}$ for $\{k_o = 0, 1, \ldots, L-1\}$. Resulting algorithms are easily extended to the applications requiring the design coordinates to cover 2L, 3L, . . . harmonics.

Frequency domain design coordinates are related to the waveform time domain digital samples or coordinates as follows.

Mappings of frequency to time (20)

Time domain design coordinates $\{\psi(n), \forall n\}$ are real and symmetric and can be represented by the reduced set $\{h_t(n), n=0, 1, \ldots ML/2\}$ $$h_t(n) = \psi(0) \quad \text{for } n = 0$$
$$= 2\psi(n) \quad \text{for } n = 1, 2, \ldots, ML/2$$
$$= \text{time domain design coordinates}$$

Frequency domain harmonic design coordinates $\{\psi_{k_o}, \forall_{k_o}\}$ are real and symmetric and can be represented by the reduced set $\{h_f(k), k=0, 1, \ldots, L-1\}$ $$h_f(k) = \psi_{k_0} \quad \text{for } k = k_0 = 0$$
$$= 2\psi_{k_0} \text{ for } k = k_0 = 1, 2, \ldots, L-1$$
$$= \text{frequency domain design coordinates}$$

Mapping of the frequency coordinates $\{h_f(k), k=0, 1, \ldots, L-1\}$ into the time coordinates $\{h_t(n), n=0, 1, \ldots, ML/2\}$ is defined by the matrix transformation to within a scale factor $$h_t = Bh_f$$

where
$h_f = (h_f(0), \ldots, h_f(ML/2))t$ transpose of column vector
$h_t = (h_t(0), \ldots, h_t(ML/2))t$ transpose of column vector $$B = (ML/2 + 1) \times L \quad \text{matrix}$$
$$= [B_{kn}] \quad \text{matrix of row } k \text{ and column } n \text{ elements } B_{kn}$$
$$B_{kn} = 1 \quad \text{for } n = 1$$
$$= 2\cos(2\pi kn/ML) \quad \text{otherwise}$$

wherein the N'=ML+1 has been replaced by ML since a single end point has been added to the FIR to make it symmetrical for ease of implementation for the example Wavelet being considered, with a sample at the mid-point that makes the number of samples N' an odd number.

Passband and stopband metrics and cost functions are derived with the aid of FIG. 3 which defines the PSD parameters of interest for the passband and stopband of the PSD $\Psi(\omega)$ for communications applications. Requirements for radar applications include these listed for communications. Referring to FIG. 3 the passband 11 of the waveform PSD is centered at dc (f=0) since we are designing the dc or baseband waveform, and extends over the frequency range $\omega_p$ extending from $-\omega_p/2$ to $+\omega_p/2$ 12 in units of the radian frequency variable $\omega=2\pi fT$ 13. The frequency space extends over the range of $f=-\frac{1}{2}T$ to $f=+\frac{1}{2}T$ which is the frequency range in FIG. 1 translated by $-\frac{1}{2}T$ so that the dc waveform is at the center of the frequency band. Quality of the PSD over the passband is expressed by the passband ripple 14. Stopband 15 starts at the edge 16 of the passbands of the adjacent channels $+/-\omega_a/2$ 16 and extends to the edge of the frequency band $\omega=+/-\pi$ 17 respectively. Stopband attenuation 18 at $+/-\omega_a/2$ measures the PSD isolation between the edge of the passband for the dc waveform and the start of the passband for the adjacent channels centered at $+/-\omega_s$ 19. Rolloff 20 of the stopband is required to mitigate the spillover of the channels other than the adjacent channels, onto the dc channel. Deadband or transition band 21 is the interval between the passbands of contiguous channels, and is illustrated in FIG. 3 by the interval from $\omega_p/2$ to $\omega_a/2$ between the dc channel and adjacent channel at $\omega_a$. Waveform sample rate $\omega_s$ 22 is the waveform repetition rate. For the LS example algorithms, the waveform sample rate is equal to the channel-to-channel spacing for zero excess bandwidth. Therefore, $1/T_s = \omega_s/2\pi T = 1/MT$ which can be solved to give $\omega_s = 2\pi/M$ for the radian frequency sampling rate of the filter bank which is identical to the waveform repetition rate.

We start by rewriting the DFT equations for the dc waveform in (11) as a function of the $\{h_f(k), k=0, 1, \ldots, L-1\}$ $$\psi(\omega) = \sum_n \psi(n)\cos(n\omega) \quad (21)$$
$$= c^t Bh_f \quad \text{using (21) and the definition of the vector "c"}$$
$$c = (1, \cos(\omega), \ldots, \cos((ML/2)\omega))^t \quad \text{transpose of column vector}$$

which is equivalent to the equation for $\psi(\omega)$ in (9) expressed as a linear function of the $\{h_f(k), k=0, 1, \ldots, L-1\}$. An ideal "c" vector "$c_r$" will be introduced for the passband and the stopband in FIG. 3 in order to identify the error residual $\delta\psi(\omega)$ at the frequency "$\omega$" in meeting the ideal passband and stopband requirements. The ideal PSD is flat and equal to "1" for the passband, and equal to "0" for the stopband. We find Error residuals for passband and stopband (22)

$$c_r = (1, 1, \ldots, 1)^t \quad \text{passband ideal "c"}$$
$$= (0, 0, \ldots, 0)^t \quad \text{stopband ideal "c"}$$
$$\delta c = c_r - c \quad \text{error vector}$$
$$\delta\psi(\omega) = \delta c^t Bh_f$$
$$= \text{Residual error relative to the ideal spectrum at "}\omega\text{"}$$

The LS metric for the passband and stopband can now be constructed as follows for the eigenvalue and the LS optimization (or equivalently, the LS algorithm) design algorithms Passband and stopband metrics (23)

$$J(\text{band}) = \frac{1}{\text{band}} \int_{band} |\delta\psi(\omega)|^2 d\omega \quad \text{Eigenvalue}$$
$$= h_f^t R \ h_f \quad \text{Eigenvalue}$$
$$= \|\delta\psi\|^2 \quad LS$$

where $$\text{band} = [0, \omega_p) \text{ passband}$$
$$= (\omega_s, \pi] \text{ stopband}$$
$$R = \frac{1}{\text{band}} \int_{\text{band}} (B^t \delta c \delta c^t B) \, d\omega$$
$$= L \times L \text{ matrix}$$
$$\delta \psi = (\delta \psi(\omega_1), \ldots, \delta \psi(\omega_u))^t$$
$$= \text{vector of error residuals at the frequencies}$$
$$\omega_1, \ldots, \omega_u \text{ across the band}$$

$\|(o)\|=$ norm or length of the vector (o) and which includes a cost function for the errors of the individual components where it is observed that the eigenvalue approach requires that the LS metrics be given as quadratic forms in the design coordinates $\{h_f(k), k=0, 1, \ldots, L-1\}$ whereas with the LS approach it is sufficient to use norm-squared LS metrics.

QMF metrics express the requirements on the deadband that the PSD's from the contiguous channels in FIG. 3 add to unity across the deadband $[\omega_p, \omega_s]$ in order that the filters be QMF filters. By suitable modification of the error vector δc, the previous construction of the passband and stopband metrics can be modified to apply to the deadband. We find Deadband metrics (24)

$$J(\text{deadband}) = \frac{1}{\text{deadband}} \int_{\text{deadband}} |\delta \psi(\omega)|^2 \, d\omega \text{ Eigenvalue}$$
$$= h_f^t R \, h_f \text{ Eigenvalue}$$
$$= \|\delta \psi\|^2 \text{ LS}$$

where $$\delta c = c_r - c(\omega) - c(\pi/M - \omega)$$

where $c(\omega)=c$ as defined in (22) and (23), and $c(\pi/M-\omega)=c$ at the offset frequency "$\pi/M-\omega$" corresponding to the overlap of the contiguous filters over the deadband.

Orthonormality metrics measure how close we are able to designing the set of waveforms to be orthonormal over the t–f space, with the closeness given by the ISI and the ACI. ISI and ACI errors are fundamentally caused by different mechanisms and therefore have separate metrics and weights to specify their relative importance to the overall sum of the LS metrics. ISI is a measure of the non-orthogonality between the stream of waveforms within a channel as per the construction in FIG. 3. On the other hand, ACI is a measure of the non-orthogonality between the waveform within a channel and the other waveforms in adjacent channels. This means the stopband performance metric has a significant impact on the ACI due to the sharp rolloff in frequency of the adjacent channel, and the ACI metric is then a measure of the residual non-orthogonality due to the inability of the stopband rolloff in frequency from completely eliminating the ACI errors.

We assume that the received waveform is identical to the filter waveforms and is transmitted at the filter output sample intervals equal to MT seconds. The second assumption means we are assuming the receiver is synchronized with the received signal. Since there is no information lost by sampling asynchronously with the received waveform, we are free to make this synchronization assumption without loss of generality. ISI metrics are derived in the following set of equations.

ISI metrics (25)

Mapping of $h_f$ into $\Psi$ $$\Psi = (\Psi(-ML/2), \ldots, \Psi(ML/2))^t \text{ transpose of column vector}$$
$$= H h_f$$
$$H = (ML+1) \times L \text{ matrix of elements } H_{kn}$$
$$H_{kn} = 1 \text{ for } n = 1$$
$$= 0.5 \cos(2\pi kn/ML+1) \text{ otherwise}$$

Offset matrix A $$A = L \times (ML+1) \text{ matrix of elements } A_{kn}$$
$$A_{kn} = 0 \text{ for row vector } k = 1$$
$$= [00 \ldots \Psi(-ML/2) \ldots \Psi((L-k)M+1)] \text{ row vector } k$$
$$12 \, kM \quad LM+1 \text{ column elements}$$

ISI error vector δE $$\delta E = L \times 1 \text{ column vector}$$
$$= A H h_f$$

ISI metric $$J(ISI) = \delta E^t \delta E \text{ Eigenvalue}$$
$$= \text{Non-linear quadratic function of } h_f$$
$$= \|\delta E\|^2 \text{ LS}$$

ACI metrics are derived using the ISI metric equations with the following modifications.

ACI metrics (26)

Mapping of $h_f$ into $\Psi$ is the same as developed for ISI Offset matrix A elements are changed as follows to apply to Channel 1:

$$A_{kn} = 0 \text{ for row vector } k = 1$$
$$= [00 \ldots \Psi(-ML/2)W_M^0 \ldots \Psi((L-k)M+1)W_M^{(L-k)}]$$
$$12 \, kM+1 \quad LM+1$$

which means the ACI error vector δE is $$\delta E = L \times 1 \text{ column vector}$$
$$= A H h_f$$

ACI metric for the two contiguous channels $$J(ISI) = 2\delta E^t \delta E \text{ Eigenvalue}$$
$$= \text{Non-linear quadratic function of } h_f$$
$$= 2\|\delta E\|^2 \text{ LS}$$

where the factor "2" takes into account there are two contiguous channels or one on either side of the reference channel 0 in FIG. 3. Because of the fast rolloff of the frequency spectrum the addition of more channels into the ACI metric is not considered necessary, although the functional form of the ACI metric in (26) allows an obvious extension to any number of adjacent channels which could contribute to the ACI.

Cost function J for the LS algorithms is the weighted sum of the LS metrics derived in (23), (24), (25), (26). The LS algorithms minimize J by selecting the optimal set of frequency coordinates $\{h_f(k), \forall k\}$ for the selected set of parameters used to specify the characteristics of the dc waveform, frequency design coordinates, LS metrics, and weights. Cost function and optimization techniques are given by the equations Cost function $J$ (27)

$$J = \sum_x w(\text{metrics}) J(\text{metrics})$$

=weighted sum of the LS metrics J(metrics) where
metrics passband, stopband, deadband, ISI, ACI {w(metrics), $\forall$metrics}=set of weights $$\sum_x w(\text{metrics}) = 1 \text{ normalization}$$

Optimization Goal

Goal: minimize J with respect to the selection of the $\{h_f(k), \forall k\}$

Optimization Algorithms

Two algorithms are the Eigenvalue and the LS optimization where the eigenvalue optimization algorithm uses the non-linear quadratic formulations of the LS metrics and the LS optimization algorithm uses the norm formulations for the LS metrics.

FIG. 4 is a summary of the LS metrics and the construction of the cost function J LS algorithms which use quadratic error metrics and LS algorithms which use norm-squared metrics. Design parameters 23 are the input and output design parameters. Input parameters are the number of polyphase channels M or equivalently the number of digital samples at spacing T over the symbol interval $T_s=MT$, the length of the FIR time response for the waveform in units of L which are the number of digital samples per waveform repetition interval $T_s$ so that the total number of digital samples for the symmetric FIR time response is equal to N'=ML+1, number of DFT samples per FIR length n_fft for implementation of the LS algorithms, passband radian frequency $\omega_p$, stopband radiam frequency $\omega_a$, waveform repetition rate in radian frequency $\omega_s$, selection of the set of design coordinates $\{h_f\}$ to be used in the optimization, and the metric weights {w(metrics)}. Output parameters are the set of harmonic design coordinates $\{h_f\}$ that minimize J. Band metrics 24 are the passband, stopband, and deadband metrics defined in equations (23), (23), (24) respectively. Interference metrics 25 are the ISI and ACI metrics defined in equations (25) and (26) respectively. LS cost function J 26 is the weighted linear sum of the metrics defined for the band 24 and the interference 25 as defined in equation (27).

FIG. 5 is a flow diagram of the LS recursive solution algorithm using quadratic error metrics and norm-square metrics. There are two loops with the topology constructed so that the outer loop 27 is an iteration over the set of metric weights {w(metrics)}, and the inner nested loop 28 is the recursive or iterative LS solution to find the optimal $\{h_f\}$ for the given design parameters and weights where each step refers to an iteration step in the solution. A recursive LS solution is required to be able to solve the highly non-linear interference metrics as well as the band metrics when one chooses to use non-linear techniques to construct these metrics.

Consider the inner nested loop 28. The recursive LS solution starts with the initial step i=0 29 which begins with the selection of the input design parameters and weights and the selection of an initial set of values for the $\{h_f\}$ 30. Next the band metrics are calculated 31. Since this is the initial step i=0 32 the cost function J is restricted to the linear band metrics in order to fine the linear approximation to $\{h_f\}$ 33 to initialize the non-linear solution starting with step i=1 34 wherein the highly non-linear interference metrics are included in J. Following the signal flow, for step i=1 the band metrics 31 and interference metrics 35 are calculated, weighted, and summed to form the cost function J 36. An iterative solution algorithm 37 finds the best approximation in step i=1 to the $\{h_f\}$ which minimizes J using the approximation to $\{h_f\}$ from the previous step i=0 to linearize the search algorithm coefficients for the eigenvalue and LS step i=1 iteration. If there is no convergence to the correct solution for $\{h_f\}$ this recursive sequence of calculations is repeated for step i=2 34. This recursive solution technique is repeated for subsequent steps until there is convergence 38 whereupon one exits this inner loop.

Consider the outer loop. After exiting the inner loop 38 the solution for $\{h_f\}$ is tested to see if it meets the performance goals 39. If not, a new set of metric weights is selected and the inner loop is initialized i=0 40 and the inner loop is used to find the next solution for $\{h_f\}$. This process continues until the performance goals are met or adequately approximated 39 whereupon the algorithm is exited with the final solution set $\{h_f\}$ 41.

Applications of this new invention to both communications and radar will be given using these example algorithms and other algorithms supported by this invention. These new waveforms are considered for the applications: 1) to replace the square-root raised-cosine waveform (sq-root rc) which is extensively used for the third generation (3G) CDMA communications, 2)to replace the Gaussian minimum shift keying (GMSK) waveform for constant amplitude bandwidth efficient (BEM) applications, and 3) as a candidate waveform for synthetic aperture radar (SAR) and real aperture radar (RAR) applications.

CDMA communications application for the current and the new 3G CDMA considers a waveform designed with this new invention as a possible replacement for the sq-rt r-c waveform with bandwidth expansion parameter $\alpha=0.22$ to $\alpha=0.40$. This notation means that for $\alpha=0.22$ the spectral efficiency is (symbol rate/bandwidth)=1/1+$\alpha$=1/1.22=0.82=82%. A basic advantage of the waveform is the potential for a symbol rate increase within the same bandwidth with an increase in the spectral efficiency to $\approx$100% depending on the application and operational constraints. The dc power spectral density or power spectrum (PSD) of the waveform is compared to the PSD for the sq-rt r-c in FIG. 6. Plotted are the measured PSD in dB 42 versus the frequency offset from dc expressed in units of the symbol rate 43 Plotted against the normalized frequency offset are the dc PSD for the new waveform 44, the sq-rt r-c with $\alpha=0.22$ 45, and the sq-rt r-c with $\alpha=0.40$ 46. It is observed that the PSD for the new waveform rolls off faster that that for the sq-rt r-c which means that the new mr waveform will support an increased symbol rate for a given available frequency band while satisfying the inherent requirements for low ISI and MAI (multiple access interference).

Constant amplitude BEM application of the new waveform indicates that it is a viable candidate for replacing the current preferred modulation waveform which is the GMSK designed to mimic a Gaussian waveform by suitable modification of the constraints on the error metrics. The GMSK finds applications for transmitters which operate their HPA (s) amplifiers in a saturation mode in order to maximize their radiated power from the HPA(s), and which require a BEM PSD to avoid excessive spreading of the transmitted power. Simulation data for the dc PSD is plotted in FIG. 7 for the new waveform BEM and the GMSK. Plotted are the measured dc PSD in dB 47 versus the frequency offset from dc expressed in units of the bit rate 48. Plotted against the normalized frequency offset are the dc PSD for the new waveform BEM 49 and the GMSK 50, for a length parameter L=10 where L is the length of the phase pulse in terms of the phase pulse repetition rate. The significance of this example data is that the new waveform has the potential to be designed to offer a PSD which is less spread out than the current GMSK, and therefore an improved BEM waveform.

Real aperture radar (RAR) and synthetic aperture radar (SAR) applications of the waveform designed to mimic a Gaussian waveform by suitable modification of the constraints on the error metrics indicate that it is a viable candidate to replace the current chirp waveforms for wideband signal transmission, when combined with pseudo-random phase codes. Results of the simulation for the new waveform and an unweighted frequency chirp waveform are given in FIG. 8. Plotted are the ambiguity function for the new waveform 51 and the unweighted frequency chirp waveform 52. The dc 2-dimensional radar ambiguity function 53 is plotted as a function of the frequency offset in units of $fT_p$ and the time offset in units of $t/T_c$ where $T_p$ is the phase-coded radar pulse length or length of the phase code and $T_c$ is the phase code chip length. The chip length is identical to the waveform repetition interval $T_s$ so that $T_c = T_s$. It is observed that the new waveform has the potential for significant improvements in the ambiguity function and by implication in the performance.

Preferred embodiments in the previous description are provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein and is to be accorded the wider scope consistent with the principles and novel features disclosed herein.

What is claimed is:

1. A least-squares method for generating and applying Wavelet waveforms and filters, said method comprising the steps:

said Wavelet is a digital finite impulse response waveform at baseband in the time domain, linear phase finite impulse response filter requirements on the passband and stopband performance of the power spectral density are specified by linear quadratic error metrics in the Wavelet, Wavelet requirements on the deadband for quadrature mirror filter properties required for perfect reconstruction are specified by a linear quadratic error metric in the Wavelet, Wavelet orthogonality requirements for intersymbol interference and adjacent channel interference are specified by non-linear quadratic error metrics in the Wavelet, non-linear quadratic error metrics have quadratic coefficients dependent on the Wavelet, Wavelet multi-resolution property requires said error metrics to be converted to error metrics in the discrete Fourier transform harmonics of the Wavelet which harmonics are the Wavelet impulse response in the frequency domain, using a least-squares recursive solution algorithm with quadratic error metrics, which algorithm requires a means to find the Wavelet harmonics that minimize the sum of said linear quadratic error metrics, said harmonics are used to linearize said non-linear quadratic error metrics, said least-squares recursive solution algorithm finds the harmonics which minimize the weighted sum of the linear and linearized quadratic error metrics, said least-squares recursive solution algorithm starts over again by using said harmonics to linearize the non-linear error metrics and to find the corresponding harmonics which minimize the sum of said linear and linearized quadratic error metrics, said least-squares recursive solution algorithm continues to be repeated until the solution converges to the design harmonics of the Wavelet which is the least-squares error solution, and said Wavelet impulse responses in the time domain and frequency domain are implemented in communication systems for waveforms and filters.

2. A second least-squares method for generating and applying Wavelet waveforms and filters, said method comprising the steps:

linear phase filter requirements on the passband and stopband performance of the power spectral density are specified by linear quadratic error metrics in the Wavelet impulse response in the time domain, using a least-squares recursive solution algorithm with norm-squared error metrics, which algorithm requires a initialization Wavelet and a means to find the Wavelet harmonics which minimize the sum of said linear norm-squared error metrics, said initialization Wavelet is the optimum Wavelet that minimizes the weighted sum of said linear quadratic error metrics which optimum Wavelet is found using an eigenvalue, Remez-Exchange, or other optimization algorithm, said linear quadratic error metrics are transformed into linear norm-squared error metrics in the Wavelet, Wavelet requirements on the deadband for quadrature mirror filter properties required for perfect reconstruction are specified by a linear norm-squared error metric in the Wavelet, Wavelet orthogonality requirements for intersymbol interference and adjacent channel interference are specified by non-linear norm-squared error metrics in the Wavelet, non-linear norm-squared error metrics have norm coefficients dependent on the Wavelet, Wavelet multi-resolution property requires said error metrics to be converted to error metrics in the discrete Fourier transform harmonics of the Wavelet which harmonics are the Wavelet impulse response in the frequency domain, using said least-squares recursive solution algorithm to find the harmonics that minimize the weighted sum of said least-squares linear and non-linear norm-squared error metrics, which harmonics are the design harmonics of the Wavelet least-squares error solution, and said Wavelet impulse responses in the time domain and frequency domain are implemented in communication systems for waveforms and filters.

3. A further method of applying Wavelet waveforms and filters of claim 1 or 2, comprising:

inverse Discrete Fourier Transform (DFT) defines a mother Wavelet digital finite impulse response waveform $\psi(n)$ as a function of the design harmonics $\psi_{k_o}$ in accordance with:

$$\psi(n) = (1/N') \sum_{k_0} \psi_{k_0} W_{N'}^{k_o n}$$

wherein:

$\psi(n)$=mother Wavelet time response for index n;

$\psi_{k_o}$=mother Wavelet frequency response harmonic for frequency index $k_o$;

$\sum_{n}$ = summation over time index $n$;

$W_{N'}^{k_o n} = e^{i2\pi k n/N'}$ inverse DFT phase rotation for index $n$ length $N'$ wherein $i = \sqrt{(-1)}$;

wherein mother Wavelet refers to a Wavelet at baseband which is used to generate other Wavelets;

multi-resolution Wavelets ($\psi_{p,q,r}(n)=2^{-p/2}\psi(2^{-p}n-qM) e^{i2\pi f_c(p,r)nT}$) are defined as a function of the design harmonics of the mother Wavelet $\psi(n)$ in addition to multi-resolution scale parameters p,q,r according to:

$$\psi_{p,q,r}(n) = (2^{-p/2}/N') \sum_{k_0} \psi_{k_0} W_{N'}^{k_o(n(p)-qM)} e^{i2\pi f_c(p,r)n(p)2^p T}$$

wherein:

p=multi-resolution traditional Wavelet scale parameter;

q=multi-resolution traditional Wavelet translation parameter;

r=frequency index is a generalization of frequency index $k_o$ and identifies the center frequency of the multi-resolution Wavelet at the scale p;

$\psi_{p,q,r}(n)$=multi-resolution Wavelet time response for scale p, translation q, frequency index r, at time index n;

M=sampling interval for Wavelet $\psi$;

$f_c(p,r)$=center frequency of the frequency translated mother Wavelet $\psi$, at scale p and frequency index r;

T=time interval for digital sampling index n;

forming a multi-channel polyphase filter bank using a multi-resolution Wavelet based on the design harmonics of the mother Wavelet and selection of multi-scale parameters including one or more traditional Wavelet parameters plus frequency, spacing, and length wherein:

frequency parameter is a frequency offset which translates the Wavelet in frequency;

spacing parameter is a number of digital samples for Wavelet spacing which is equal to a number of channels in a polyphase filter bank with a Nyquist sampling rate;

length parameter specifies a length of the Wavelet in the sampling domain; and said multi-resolution parameters and the mother Wavelet design harmonics generate the multi-resolution Wavelet for the multi-channel polyphase filter bank incorporated in a communications system.

4. Wherein the method of claim 3, further comprising:

selecting the design harmonics and multi-resolution parameters so that the Wavelet is designed for a communications waveform with no excess bandwidth, varying the sampling rate in the frequency domain to enables the multi-resolution Wavelets to behave like an accordion in that at different scales the Wavelet is a stretched or compressed version of the mother Wavelet, modifying the constraints on the error metrics to enable the multi-resolution Wavelets to be designed for other applications including bandwidth efficient modulation and synthetic aperture radar, and other optimization algorithms for generating said Wavelets.

* * * * *